(12) United States Patent
Ueda et al.

(10) Patent No.: US 11,137,769 B2
(45) Date of Patent: Oct. 5, 2021

(54) AUTONOMOUS TRAVELER AND TRAVEL CONTROL METHOD THEREOF

(71) Applicant: TOSHIBA LIFESTYLE PRODUCTS & SERVICES CORPORATION, Kawasaki (JP)

(72) Inventors: Yutaka Ueda, Hino (JP); Toshihiro Kayama, Takatsu (JP)

(73) Assignee: TOSHIBA LIFESTYLE PRODUCTS & SERVICES CORPORATION, Kawasaki (JP)

( * ) Notice: Subject to any disclaimer, the term of this patent is extended or adjusted under 35 U.S.C. 154(b) by 284 days.

(21) Appl. No.: 16/415,086

(22) Filed: May 17, 2019

(65) Prior Publication Data

US 2019/0361462 A1    Nov. 28, 2019

(30) Foreign Application Priority Data

May 24, 2018    (JP) ............... JP2018-099716

(51) Int. Cl.
| | | |
|---|---|---|
| G05D 1/02 | (2020.01) | |
| G06F 16/29 | (2019.01) | |
| G06F 16/23 | (2019.01) | |
| G05D 1/00 | (2006.01) | |

(52) U.S. Cl.
CPC ......... *G05D 1/0274* (2013.01); *G05D 1/0088* (2013.01); *G05D 1/0238* (2013.01); *G06F 16/23* (2019.01); *G06F 16/29* (2019.01); *G05D 2201/0213* (2013.01)

(58) Field of Classification Search
CPC .. G05D 1/0274; G05D 1/0088; G05D 1/0238; G05D 2201/0213; G06F 16/23; G06F 16/29
USPC ......................................................... 701/23
See application file for complete search history.

(56) References Cited

U.S. PATENT DOCUMENTS

| | | |
|---|---|---|
| 5,696,675 A | 12/1997 | Nakamura et al. |
| 9,357,893 B2 | 6/2016 | Lee |
| 2014/0343783 A1 | 11/2014 | Lee |
| 2018/0200888 A1* | 7/2018 | Kim ..................... G05D 1/0246 |

FOREIGN PATENT DOCUMENTS

| | | |
|---|---|---|
| JP | 2-241422 | 9/1990 |
| JP | 8-16241 | 1/1996 |
| JP | 2000-353013 | 12/2000 |
| JP | 2014-229300 | 12/2014 |

* cited by examiner

*Primary Examiner* — Gertrude Arthur Jeanglaude
(74) *Attorney, Agent, or Firm* — Oblon, McClelland, Maier & Neustadt, L.L.P.

(57) ABSTRACT

An autonomous traveler 1 includes an information acquisition part 11, a map storage part 12 and a travel control part 7. The information acquisition part 11 acquires information on a traveling area. The map storage part 12 creates and stores a base map, by determining the traveling area on the basis of the information acquired by the information acquisition part 11 at a predetermined timing. The travel control part 7 controls traveling on the basis of a map stored in the map storage part 12. The travel control part 7 controls the traveling on the basis of the base map, even when a traveling obstacle stored in the base map is removed.

6 Claims, 5 Drawing Sheets

AUTONOMOUS TRAVELER AND TRAVEL CONTROL METHOD THEREOF

CROSS-REFERENCE TO RELATED APPLICATION

This application is based upon and claims the benefit of priority from Japanese Patent Application No. 2018-99716, filed May 24, 2018; the entire contents of which are incorporated herein by reference.

FIELD

An embodiment according to the present invention relates to an autonomous traveler capable of traveling autonomously and a travel control method thereof.

BACKGROUND

In the case where an area not to be subjected to intrusion by an autonomous traveling vacuum cleaner is set in a conventional manner, for example, a setting device for setting a virtual wall by outputting infrared rays or lines of magnetic force in advance is arranged in a room, or alternatively an electronic device such as a smartphone is used to set an intrusion prohibition area on a room map.

In the case of using a setting device as described above, the setting device needs to be arranged in the room at all times. In the case of using an electronic device to set an intrusion prohibition area, input and setting are complicated. Therefore, a travelable area is desired to be set more easily, and usability in setting is desired to be improved.

DETAILED DESCRIPTION

The autonomous traveler according to the present embodiment is an autonomous traveler capable of traveling autonomously. The autonomous traveler includes an information acquisition part, a map storage part, and a travel control part. The information acquisition part acquires information on a traveling area. The map storage part determines the traveling area on the basis of the information acquired by the information acquisition part at a predetermined timing, and creates and stores a base map. The travel control part controls traveling on the basis of the map stored in the map storage part. Even when a traveling obstacle stored in the base map is removed, the travel control part controls the traveling on the basis of the base map.

One embodiment will be described below with reference to the drawings.

Figure 1:
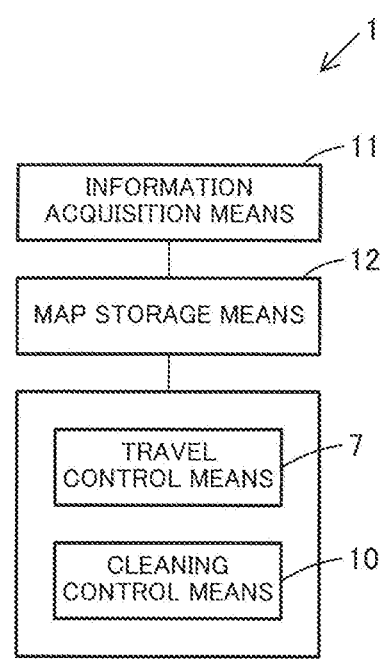
FIG. 1 is a block diagram illustrating an internal structure of an autonomous traveler according to one embodiment.
Figure 2:
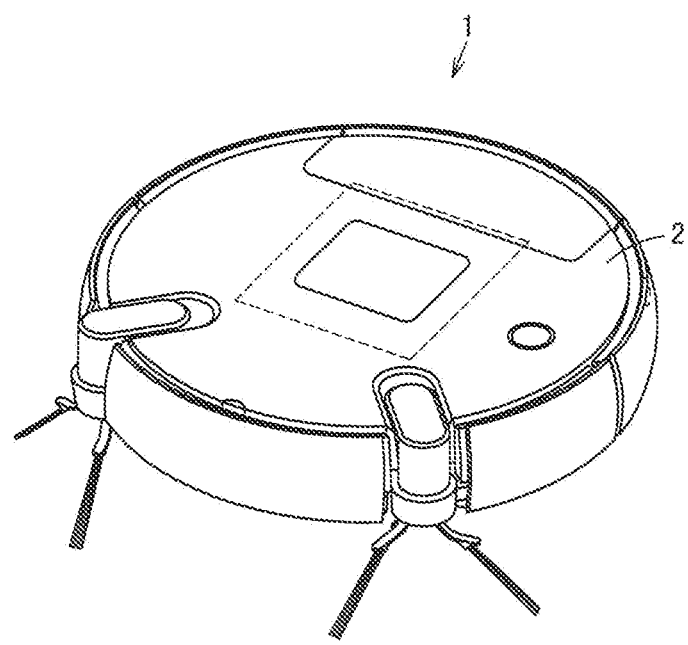
FIG. 2 is a perspective view of the above autonomous traveler.

In FIG. 1 and FIG. 2, reference sign 1 denotes an autonomous traveler. In the present embodiment, the autonomous traveler 1 cleans a floor surface while autonomously traveling on the floor surface. In the present embodiment, an autonomous traveling robot cleaner is described as an example. The autonomous traveler may be a monitoring robot or the like not equipped with a cleaning function.

The autonomous traveler 1 includes a main body 2. The autonomous traveler 1 further includes traveling means for allowing the main body 2 to travel. The traveling means includes a travel control part 7 and the like. The travel control part 7 corresponds to travel control means for controlling a motor serving as driving means for driving a driving wheel serving as a driven part.

In the present embodiment, the autonomous traveler 1 further includes cleaning means for cleaning a floor surface. The cleaning means includes a cleaning control part 10 and the like. The cleaning control part 10 corresponds to cleaning control means for driving an electric blower or the like for sucking dust and dirt into a dust-collecting unit.

The autonomous traveler 1 further includes an information acquisition part 11 which corresponds to information acquisition means for acquiring information on the traveling area. The information acquisition part 11 detects a traveling obstacle in the traveling area. The information acquisition part 11 includes an obstacle sensor for detecting a traveling obstacle, for example, a wall and a pillar in front of the main body 2 in the traveling direction thereof, and a step gap and the like below the main body 2. For example, an infrared sensor or an ultrasonic sensor may be used as an obstacle sensor. A sensor or the like using an image captured by one or more cameras may be used. A sensor for detecting an object or a step gap by contact may be used. Alternatively, arbitrary combination of these may be used. In the case where a camera is used as an obstacle sensor, a camera for capturing an image of a watching target may be used.

The autonomous traveler 1 further includes a map storage part 12 which corresponds to map storage means. The map storage part 12 is a memory for creating and storing a map, by determining the traveling area in which the main body 2 is able to travel, on the basis of the information on the traveling area acquired by the information acquisition part 11, and further estimating the self-position. A known simultaneous localization and mapping (SLAM) technology or the like is enabled to be used to create the map information and estimate the self-position, and thus the details thereof will be omitted. The map storage part 12 may be configured with map creation means and storage means.

In the present embodiment, the map storage part 12 is capable of creating and storing a base map at a predetermined timing, by determining the traveling area on the basis of the information acquired by the information acquisition part 11. The base map herein refers to a map in which a traveling obstacle is arranged around an intrusion prohibition area in the traveling area at a predetermined timing, and which allows, after initial traveling, prevention of intrusion into the intrusion prohibition area, without requiring the arrangement of any traveling obstacle at the next traveling. On the other hand, the predetermined timing, the traveling area or the like is reset by a user, thereby enabling to change the intrusion prohibition area in the traveling area.

Also, in the case where a traveling obstacle in the traveling area not stored in the base map is detected on the basis of the information acquired by the information acquisition part 11, the map storage part 12 stores the detected traveling obstacle as additional map information.

The autonomous traveler 1 may include a secondary battery as a power source part for supplying power to the traveling means, the cleaning means and the like. In the present embodiment, a charging terminal for charging the secondary battery may be arranged in the main body 2.

Moreover, the autonomous traveler 1 may further include communication means such as a wireless LAN device, capable of directly communicating with an external device, for example, a smartphone, via a network or wirelessly. The autonomous traveler 1 may further include an input part such as a touch panel or a button that allows a user to directly input settings and the like.

The next description is about control or a control method of one embodiment.

The autonomous traveler 1 starts to travel. First, in an information acquiring step, the information acquisition part 11 acquires information on the traveling area. Then, in a storing step, the map storage part 12 creates and stores as the base map the information on the traveling area in which the autonomous traveler 1 has traveled at a predetermined timing, on the basis of the information acquired by the information acquisition part 11. Thereafter, in a traveling step, the travel control part 7 of the autonomous traveler 1 controls traveling on the basis of the map stored in the map storage part 12. In the traveling step, the travel control part 7 of the autonomous traveler 1 also controls the traveling on the basis of the base map, even when the traveling obstacle stored in the base map is removed. Also, in the storing step, a traveling obstacle not stored in the base map is able to be added into the map storage part 12 as additional map information. Further, in the storing step, the map storage part 12 is able to also delete the map information added into the base map from the base map.

The base map according to the present embodiment is used to store the arrangement of a traveling obstacle at a predetermined timing to be retained for the next and subsequent traveling in the map storage part 12. The base map according to the present embodiment is further used to set an intrusion prohibition location at a predetermined timing, in order that the travel control part 7 controls the traveling so as not to deviate from the traveling area regardless of whether or not the traveling obstacle at the predetermined timing is arranged in the traveling area at the next and subsequent traveling. The base map according to the present embodiment may be created by overwriting the base map with new map information in the case where the base map is not stored in the map storage part 12. Alternatively, new map information may be created separately from the base map stored in the map storage part 12. Preferably, a user is able to select and set one of these by use of an input part, an external device, or the like.

Figure 3:
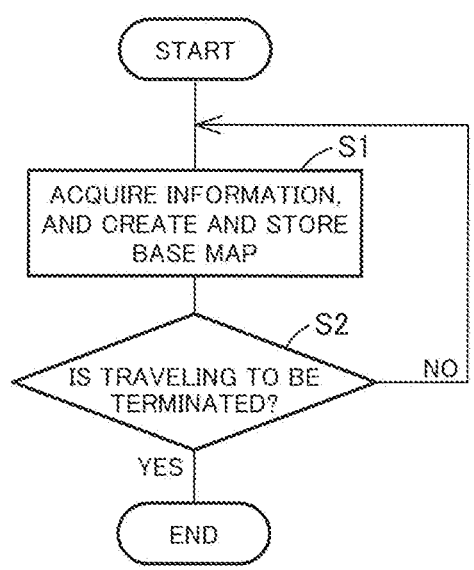
FIG. 3 is a flowchart indicating control for creating a base map for the above autonomous traveler.

The creation of the base map and the creation method thereof will be described with reference to the example of the flowchart of FIG. 3. A traveling obstacle is set in the intrusion prohibition area. The main body 2 starts to travel.

The map storage part 12 creates and stores the base map. In step S1, in the autonomous traveler 1, the information acquisition part 11 acquires information at a predetermined timing to determine the traveling area, as the information acquiring step, and thereafter the map storage part 12 creates and stores the base map, as the storing step. Then in step S2, in the autonomous traveler 1, the travel control part 7 determines whether to terminate the traveling. In the case where the traveling is determined to be terminated, the traveling is terminated. In the case where the traveling is determined not to be terminated, the processing is moved back to step S1.

On the other hand, the map storage part 12 is able to store a traveling obstacle not stored in the base map as additional map information, on the basis of the information on the traveling obstacle in the traveling area acquired by the information acquisition part 11. The map storage part 12 is also able to delete the additional map information from the base map stored in the map storage part 12. According to the present embodiment, the map information is updated in order to make the map storage part 12 store the presence or absence of a traveling obstacle not stored in the base map. At this time, the base map itself is not updated nor changed. Moreover, in the present embodiment, the determined traveling obstacle in the base map is retained, regardless of whether or not the traveling obstacle is detected by the information acquisition part 11 at the next and subsequent traveling after the determination.

Figure 4:
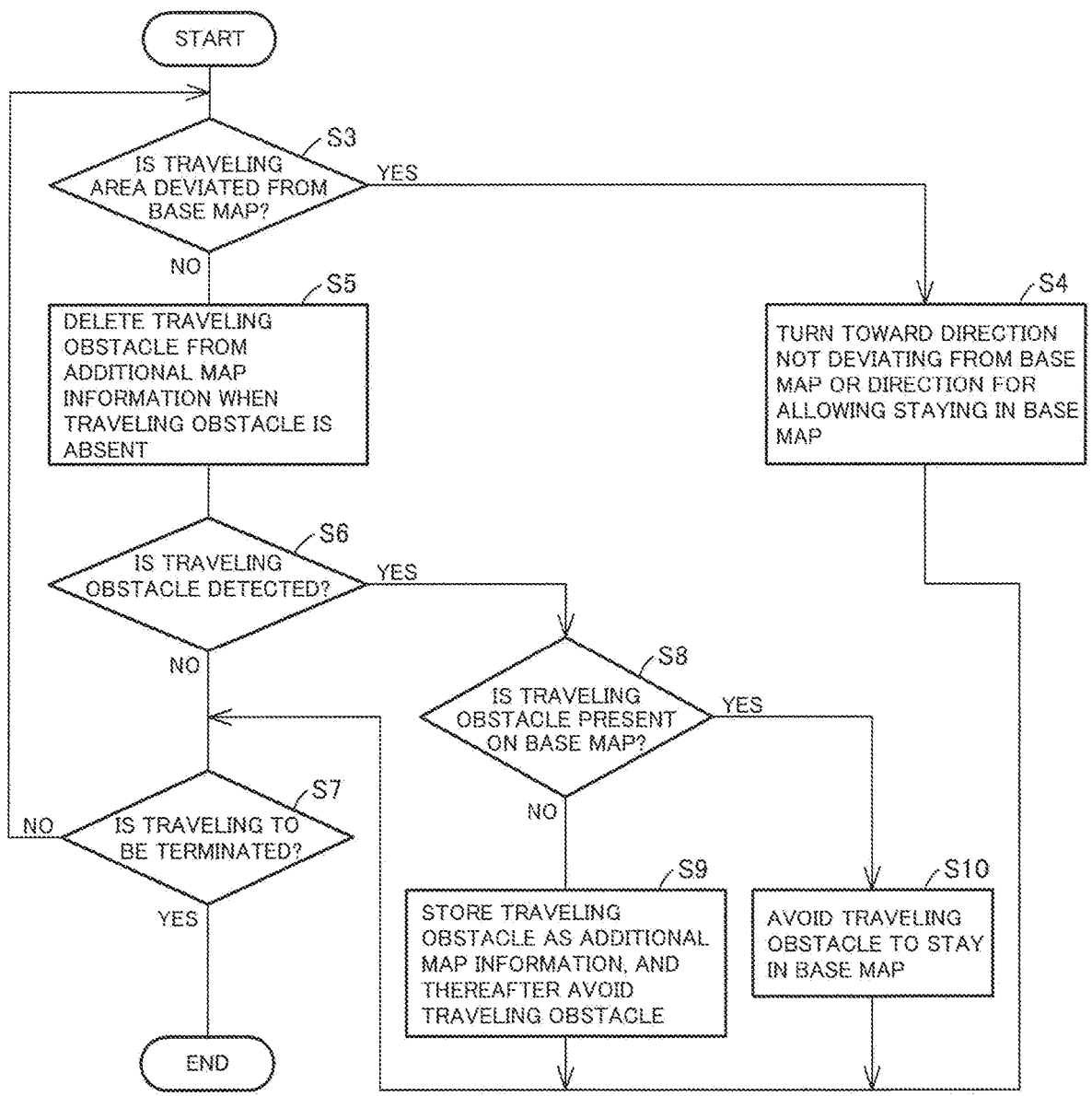
FIG. 4 is a flowchart indicating control for deleting or updating on the basis of the base map for the above autonomous traveler.

The next description with reference to the example of the flowchart of FIG. 4 is about the control for updating or deleting the map information on the basis of the base map, or the control method thereof. After the main body 2 starts to travel, the travel control part 7 of the autonomous traveler 1 controls the traveling of the main body 2 on the basis of the base map stored in the map storage part 12, as a travel control step. In step S3, the travel control part 7 determines whether or not the currently-traveling area is deviated from the base map, or alternatively determines whether or not the currently-traveling area corresponds to the intrusion prohibition area stored in the base map. In step S4 of the case where the area is deviated from the base map, the area corresponds to the intrusion prohibition area in which a traveling obstacle is removed. The travel control part 7 controls the driving of a motor to turn toward the direction not deviating from the base map or the direction for allowing staying in the base map. Thereafter, the processing is moved to step S7. On the other hand, in step S5 of the case where the area is not deviated from the base map, the area does not correspond to the intrusion prohibition area. In the case where the traveling obstacle is absent which is stored in the base map as the additional map information on the basis of the information on the traveling area acquired by the information acquisition part 11, the traveling obstacle is deleted from the additional map information, and the processing is moved to step S6. Alternatively, step S5 may be omitted. In step S6, the travel control part 7 determines whether or not a traveling obstacle such as an obstacle or a step gap has been detected, on the basis of the information on the traveling area acquired by the information acquisition part 11. In step S6, in the case where the travel control part 7 determines that a traveling obstacle has not been detected, the processing is moved to step S7. The travel control part 7 determines whether to terminate the traveling in step S7. In the case of determining the traveling to be terminated, the travel control part 7 terminates the control. In the case where the travel control part 7 determines the traveling not to be terminated, the processing is moved back to step S3. Also, in step S6, in the case where the travel control part 7 determines that a traveling obstacle has been detected, the processing is moved to step S8. In step S8, the travel control part 7 determines whether or not the traveling obstacle is present on the base map. In step S8, in the case where the travel control part 7 determines that the traveling obstacle is absent on the base map, the processing is moved to step S9. In step S9, the map storage part 12 stores the traveling obstacle as additional map information, and thereafter the traveling is controlled so as to avoid the traveling obstacle. Then, the processing is moved to step S7. Also, in step S8, in the case where the travel control part 7 determines that the traveling obstacle is on the base map, the processing is moved to step S10. In step S10, the travel control part 7 controls the traveling so that the main body 2 stays in the base map while avoiding the traveling obstacle, and thereafter the processing is moved to step S7.

Moreover, after the autonomous traveler 1 starts to travel from a predetermined position such as a charging table, the travel control part 7 controls the traveling on the basis of the information on the traveling area acquired by the information acquisition part 11, and simultaneously the map storage part 12 creates and stores the base map at a predetermined timing. Thereafter, after the traveling area is determined, the travel control part 7 of the autonomous traveler 1 is able to control the main body 2 to move to a predetermined position such as a charging table to terminate the traveling, or is able to control the main body 2 to travel on the basis of the base map stored in the map storage part 12.

Also, in the case where new map information is added into the base map stored in the map storage part 12, after the autonomous traveler 1 starts to travel from a predetermined position such as a charging table, the travel control part 7 controls the main body 2 to travel on the basis of the base map stored in the map storage part 12, and further in the case where the additional map information is stored in the base map, controls the main body 2 to further avoid the traveling obstacle corresponding to the additional map information. The present embodiment enables to delete or update the additional map information on the basis of the information acquired by the information acquisition part 11, while retaining the base map. After the traveling in a predetermined traveling area is terminated, the travel control part 7 of the autonomous traveler 1 is able to control the main body 2 to move to a predetermined position such as a charging table to terminate the traveling, or is able to control the main body 2 to travel on the basis of the base map after updating stored in the map storage part 12.

Moreover, the next specific description with reference to FIG. 5 is about the base map, and the map updating based on the base map or the map updating method thereof, according to the present embodiment.

Figure 5A:
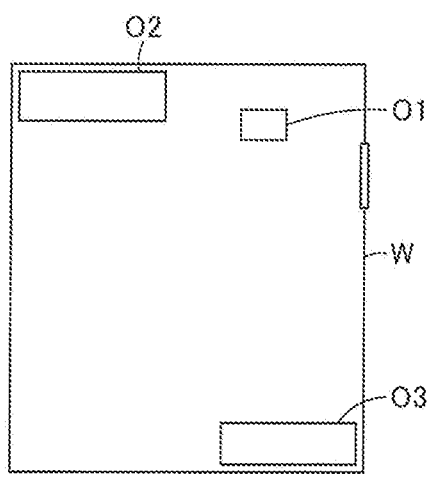
FIG. 5A is an explanatory drawing illustrating an example of a traveling area of the above autonomous traveler.
Figure 5D:
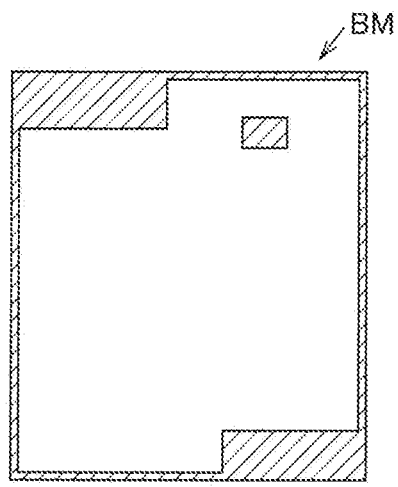
FIG. 5D is an explanatory drawing illustrating the base map corresponding to the traveling area shown in FIG. 5A created by a map storage part of the above autonomous traveler.

As shown in FIG. 5A, in the case of the traveling area which is surrounded by outer walls W and a door and includes an obstacle 01, an obstacle 02 and an obstacle 03, the map storage part 12 creates and stores a base map BM as shown in FIG. 5D.

Figure 5B:
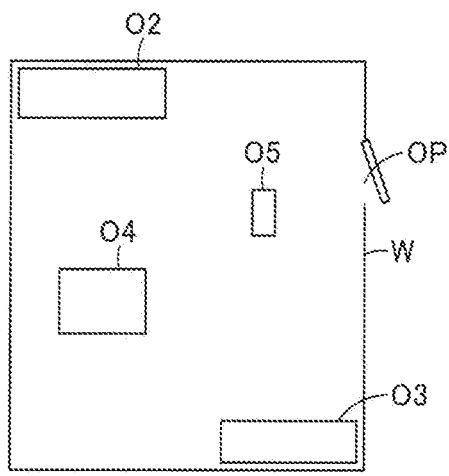
FIG. 5B is an explanatory drawing illustrating an example of the arrangement of traveling obstacles after change in the traveling area shown in FIG. 5A.
Figure 5E:
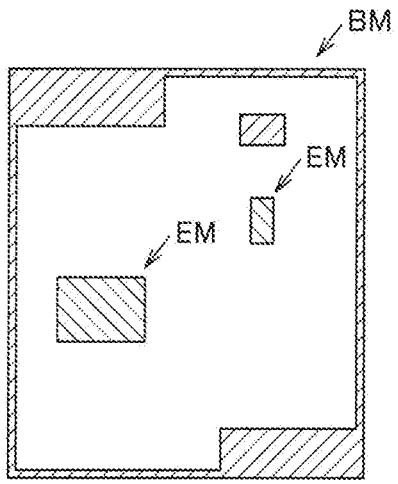
FIG. 5E is an explanatory drawing in which the additional map information corresponding to the traveling area shown in FIG. 5B is added into the base map.

The following case as shown in FIG. 5B is supposed, in which the obstacle 01 is removed from the traveling area and an obstacle 04 and an obstacle 05 are newly arranged, and further a door OP is open. In the state where the base map BM as shown in FIG. 5D is created, the obstacles 04, 05 which correspond to the traveling obstacles acquired by the information acquisition part 11 but not present on the base map BM are to be stored in the base map. On the other hand, the removal of the obstacle 01 which has been present on the base map BM and the door OP which has been present on the base map BM are not to be changed even after the acquisition by the information acquisition part 11. Since the base map at the predetermined timing stored in the map storage part 12 is not changed in the present embodiment, only an additional map information EM with regard to each of the obstacles 04, 05 is added into the base map BM shown in FIG. 5D, and the data as shown in FIG. 5E is stored in the map storage part 12.

Figure 5C:
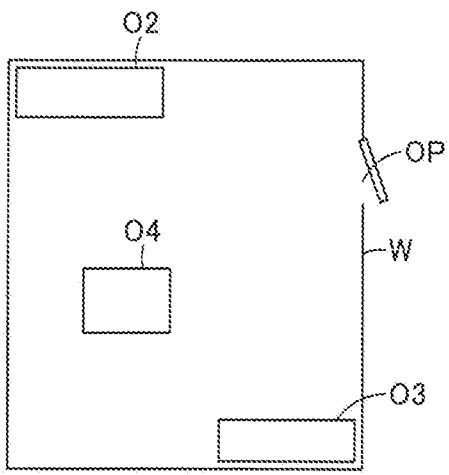
FIG. 5C is an explanatory drawing illustrating an example of the arrangement of the traveling obstacles after change in the traveling area shown in FIG. 5B.
Figure 5F:
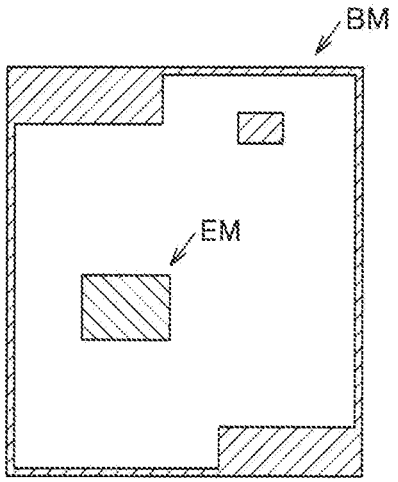
FIG. 5F is an explanatory drawing in which the additional map information corresponding to the traveling area shown in FIG. 5C is added into the base map.

Thereafter, in the case where, as shown in FIG. 5C, the obstacle 04 is moved from the traveling area shown in FIG. 5B and where the obstacle 05 is removed from the traveling area, the obstacle 05 is deleted, and the movement of the obstacle 04 is stored as the additional map information EM as shown in FIG. 5F in the map storage part 12.

As described above, the map storage part 12 creates and stores the base map of the traveling area on the basis of the information acquired by the information acquisition part 11 at a predetermined timing. After the creation of the base map, when a traveling obstacle in the traveling area not stored in the base map is detected on the basis of the information acquired by the information acquisition part 11, the detected traveling obstacle is stored in the base map as additional map information. The travel control part 7 controls the traveling on the basis of the base map stored in the map storage part 12, and further in the case where the additional map information is stored in the base map, controls the traveling so as to avoid the traveling obstacle corresponding to the additional map information. Therefore, a setting device or the like for setting the intrusion prohibition area, such as a necessary traveling obstacle, a partition or a virtual guard, is set only at the predetermined timing when the map storage part 12 creates the base map. This method enables to control the traveling of the main body 2 of the autonomous traveler 1, as if such a setting device is arranged without any actual arrangement thereof, after the creation. Accordingly, the temporary arrangement of such a setting device in the traveling area eliminates the necessity of manual setting of the intrusion prohibition area by a user all the time, thereby facilitating the setting of the intrusion prohibition area and a travelable area.

The additional map information is also able to be deleted from the base map. Accordingly, such additional map information is not endlessly added, and thus the travelable area is not reduced.

With respect to the additional map information stored in the base map, in the case where the traveling obstacle corresponding to the additional map information is not detected by the information acquisition part 11, the traveling obstacle may be deleted on the basis of the detection frequency thereof or the number of times at which the main body 2 passes by the obstacle. This method enables to effectively use the memory capacity of the autonomous traveler 1, by deleting from the base map the traveling obstacle temporarily arranged in the traveling area, and further enables to retain the necessary additional map information.

In the case where the volume of the additional map information stored in the base map becomes equal to or greater than a predetermined volume, the additional map information corresponding to the traveling obstacle having a detection frequency equal to or less than a predetermined value may be deleted from the base map. In a predetermined number of times of traveling, the additional map information corresponding to the traveling obstacle which is detected the number of times equal to or less than a predetermined threshold value may be deleted from the base map in the map storage part 12. In this case, the traveling obstacle which is removed temporarily from the traveling area is hardly deleted, but the traveling obstacle which is arranged temporarily is easily deleted from the traveling area.

Moreover, in the case where the traveling obstacle in the traveling area not present on the base map is detected a predetermined number of times or more on the basis of the information acquired by the information acquisition part 11, the additional map information corresponding to the traveling obstacle may be stored in the base map in the map storage part 12. This method enables to hardly store the traveling obstacle which is arranged temporarily in the traveling area, thereby enabling to effectively use the memory capacity of the autonomous traveler 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An autonomous traveler capable of traveling autonomously, the autonomous traveler comprising:
    an information acquisition part configured to acquire information on a traveling area;
    a map storage part configured to determine the traveling area by recognizing an arrangement of a traveling obstacle on a basis of the information acquired by the information acquisition part at a predetermined timing, and create and store a base map showing the trawling area; and
    a travel control part configured to control traveling on a basis of a map stored in the map storage part, wherein
    the map storage part adds or deletes additional map information in the base map in accordance with presence or absence of a traveling obstacle not present on the base map, on a basis of the information acquired by the information acquisition part, wherein
    the travel control part controls the traveling on a basis of the base map and the additional map information so as to avoid the traveling obstacle, even when the traveling obstacle stored in the base map is removed from the traveling area.

2. The autonomous traveler according to claim 1, wherein when a new traveling obstacle not present on the base map in the traveling area is detected a predetermined number of times or more, on a basis of the information acquired by the information acquisition part, the map storage part stores the new traveling obstacle as additional map information in the base map.

3. The autonomous traveler according to claim 1, wherein the map storage part deletes the additional map information corresponding to the traveling obstacle having a detection frequency equal to or less than a predetermined value, from the base map.

4. A travel control method for an autonomous traveler capable of traveling autonomously, the autonomous traveler comprising an information acquisition part, a map storage part and a travel control part, the travel control method comprising:
    an information acquiring for acquiring information on a traveling area by the information acquisition part;
    a storing for determining the traveling area by recognizing an arrangement of a traveling obstacle on a basis of the information on a traveling area acquired by the information acquisition part at a predetermined timing, and creating a base map showing the traveling area and storing the base map showing the traveling area in the map storage part; and
    a traveling for controlling traveling by the travel control part, on a basis of a map stored in the map storage part, wherein
    in the storing, the map storage part adds or deletes additional map information in the base map in accordance with presence or absence of a traveling obstacle not present on the base map, on a basis of the information acquired by the information acquisition part,
    in the traveling, the travel control part controls the traveling on a basis of the base map and the additional map information so as to avoid the traveling obstacle, even when the traveling obstacle stored in the base map is removed from the traveling area.

5. The travel control method for the autonomous traveler according to claim 4, wherein
    in the storing, when a new traveling obstacle not present on the base map in the traveling area is detected a predetermined number of times or more, the map storage part stores the new traveling obstacle as additional map information in the base map.

6. The travel control method for the autonomous traveler according to claim 4, wherein
    in the storing, the map storage part deletes the additional map information corresponding to the traveling obstacle having a detection frequency equal to or less than a predetermined value, from the base map.

* * * * *